March 4, 1941. W. J. CLEMENTS 2,233,471
HOSE CONNECTION FOR VACUUM CLEANERS
Filed June 24, 1939
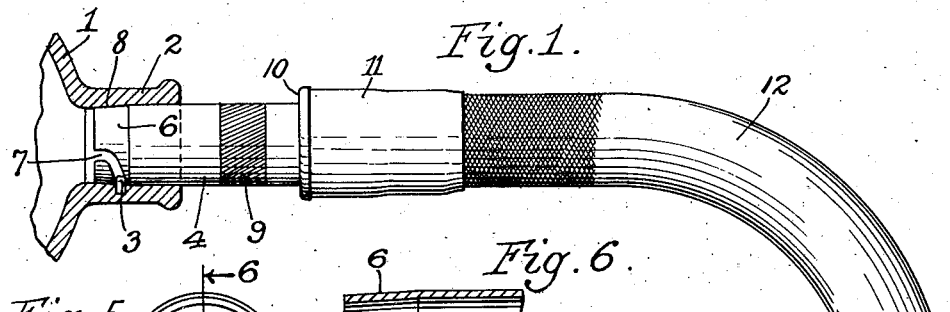
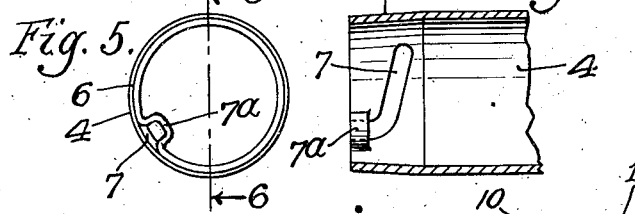
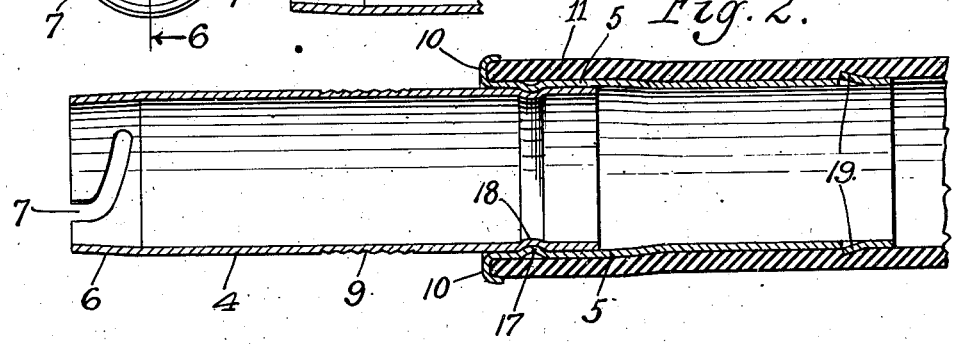
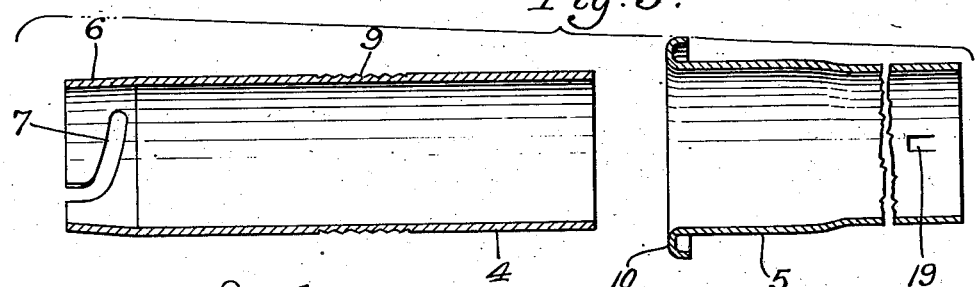
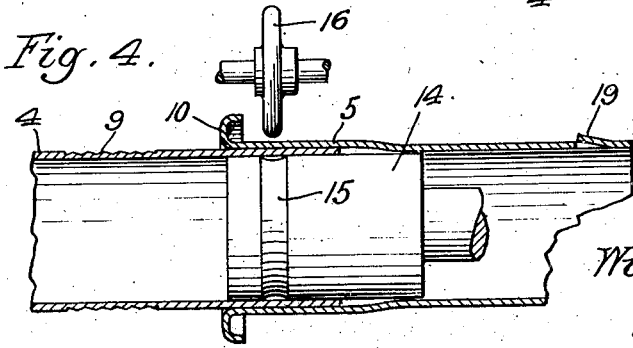
Inventor.
William J. Clements.
by Parker & Carter
Attorneys.

Patented Mar. 4, 1941

2,233,471

UNITED STATES PATENT OFFICE 2,233,471

HOSE CONNECTION FOR VACUUM CLEANERS

William J. Clements, Chicago, Ill., assignor to Clements Mfg. Co., Chicago, Ill., a corporation of Illinois Application June 24, 1939, Serial No. 280,953

1 Claim. (Cl. 285—97.1)

My invention relates to an improvement in hose connections and has for one purpose the provision of a hose connection for vacuum cleaner attachments, nozzles and the like, in which, for example, a relatively long flexible hose of fabric and rubber, or the like, is provided, which may carry a tool at its outer end.

Another purpose is the provision of improved means for securing the hose connection to a vacuum cleaner casing.

Another purpose is the provision of an improved hose connection which permits the relative rotation of two interconnecting tubular members.

Another purpose is the provision of an improved lock or securing means for connecting together two tubular members employed, for example, in a hose connection, whereby relative longitudinal movement is prevented but relative rotation is permitted.

Other purposes will appear from time to time in the course of the specification and claim.

I illustrate my invention more or less diagrammatically in the accompanying drawing wherein:

Fig. 1 is a side elevation of my hose connection, with a portion of a vacuum cleaner housing illustrated in section;

Fig. 2 is an axial section through the hose connection proper on an enlarged scale;

Fig. 3 illustrates the separate parts which form the hose connection;

Fig. 4 is a diagrammatic illustration of the formation of the locking means for locking the two tubular members together;

Fig. 5 is an end view of the connection tube, illustrating a variant form of my device; and Fig. 6 is a section at the line 6—6 on Fig. 5.

Like parts are indicated by like symbols throughout the specification and drawing.

Referring to the drawing, I generally indicates any suitable vacuum cleaner housing having a neck portion 2 provided with a securing pin 3. 4 is an inner tubular member interpenetrating with an outer tubular member 5. The member 4 may be tapered at its end, as at 6, where it penetrates the neck 2 of the housing. It is provided also with a bayonet slot 7 adapted to receive the pin 3 and formed to draw the tapered portion 6 against an opposed tapered portion 8 of the neck 2 when the tubular member 4 is rotated.

9 is any suitable exterior knurling for ease of handling and to render the manual rotation of the tubular member 4 easier for the locking operation.

The outer tubular member 5 is provided with an outwardly and rearwardly turned lip portion 10, against which abuts a surrounding sleeve or jacket 11 of rubber or the like. This sleeve is secured in any suitable fashion to a flexible tube 12, the outer end of which may be secured to any suitable suction tube, brush, or the like, not herein shown.

In the formation of the hose connection above described, I may employ a rotary member 14, which may be mounted on a lathe or other suitable rotating medium, not herein shown. It is channeled circumferentially as at 15. 16 indicates any suitable radial roller aligned with and adapted to be thrust inwardly toward the channel 15. The interconnecting tubular members 4 and 5, which are shown as blanks or unchanneled members in Fig. 3, are assembled in the desired relative longitudinal position and are then placed upon the support or mandrel 14. They are then rotated in unison with the mandrel, and the roller 16 is thrust thereagainst in such fashion as to form interpenetrating inwardly convex projections 17 on the member 5, and 18 on the member 4. It will be understood that there is sufficient clearance between the members 4 and 5 to permit their relative rotation, although a fairly snug fit is preferable.

I find that the application of the exterior roller 16 against the outer member 5 is effective simultaneously to channel the above members and to form them as shown in Fig. 2, without locking the two together. However, if circumstances warrant, I may interpose any suitable flexible spacing member between them, such as a sheet of fabric or fiber, which may thereafter be removed. Under most ordinary circumstances, however, this is not necessary.

19 indicates a tongue or tongues, which may be punched out of the outer hose connection member 5, and outwardly flexed with the free edge of the tongues facing toward the flange 10. These tongues are effective to lock into the inner surface of the tube or hose 12, thereby preventing the hose from longitudinal movement away from the flange.

It will be realized that whereas I have described and illustrated a practical and operative device, nevertheless many changes may be made in the size, shape, number and disposition of parts without departing from the spirit of my invention. I therefore wish my description and drawing to be taken as in a broad sense illustrative or diagrammatic, rather than as limiting me to my precise showing.

For example, in the place of having an open slot, as shown at 7 in Figs. 1, 2 and 3, I illustrate the terminal portion of the slot as inwardly offset as at 7a in Fig. 5, whereby the length of the actually severed portion of the slot is reduced. This inwardly offset portion 7a is of sufficient depth to clear the end of the pin 3, whereby the locking operation is the same as in the form of Figs. 1 to 3.

I claim:

In a hose connection for vacuum cleaners and the like, a pair of interpenetrating and generally cylindrical telescoping tubular members of sheet metal, said members being circumferentially grooved, the convexity of the groove of the outer member interpenetrating with the concavity of the groove of the inner member, said interpenetrating grooves being of sufficient depth to prevent relative axial movement of the two tubular members, the clearance between the opposed faces of the tubular members being sufficient to provide for their ready relative rotation, and the flexible hose member to which one of the members is connected extending about the exterior of the joint between said tubular members and concealing the circumferential grooved portion of the joint.

WILLIAM J. CLEMENTS.